(12) United States Patent
Boivin et al.

(10) Patent No.: US 6,467,561 B1
(45) Date of Patent: Oct. 22, 2002

(54) APPARATUS AND KIT FOR COUPLING A SNOWMOBILE SUSPENSION

(75) Inventors: Denis Boivin, La Pocatière (CA); Alain Boivin, St-Henri de Levis (CA)

(73) Assignee: Bombardier Inc., Valcourt (CA)

( * ) Notice: Subject to any disclaimer, the term of this patent is extended or adjusted under 35 U.S.C. 154(b) by 0 days.

(21) Appl. No.: 09/656,163

(22) Filed: Sep. 6, 2000

Related U.S. Application Data
(60) Provisional application No. 60/188,153, filed on Mar. 9, 2000.

(51) Int. Cl.[7] ............................................. B62M 27/02
(52) U.S. Cl. ...................................... 180/193; 180/190
(58) Field of Search ................................ 180/182, 190, 180/192, 193; 305/124, 127, 120, 134; 74/469; 403/151, 52, 65, 119, 69

(56) References Cited

U.S. PATENT DOCUMENTS

| | | | | |
|---|---|---|---|---|
| 3,613,810 A | * | 10/1971 | Hetteen | 180/9.58 |
| 3,711,164 A | * | 1/1973 | Chaumont | |
| 3,841,717 A | * | 10/1974 | Parisotto et al. | 305/25 |
| 4,222,453 A | * | 9/1980 | Fixsen et al. | 180/193 |
| 4,462,480 A | | 7/1984 | Yasui et al. | |
| 4,826,260 A | * | 5/1989 | Plourde | 305/24 |
| 5,228,797 A | * | 7/1993 | Ota et al. | 403/147 |
| 5,667,031 A | | 9/1997 | Karpik | |
| 5,692,579 A | | 12/1997 | Peppel et al. | |
| 5,881,834 A | | 3/1999 | Karpik | |
| 5,944,134 A | | 8/1999 | Peppel | |
| 6,234,264 B1 | * | 5/2001 | Boivin et al. | 180/193 |
| 6,263,991 B1 | * | 7/2001 | Savage et al. | 180/190 |

OTHER PUBLICATIONS

Race & Rallys', SnowTech Magazine; "Inside Suspension Coupling", Apr. 26, 2000, pp. 1–10.
SnowTech Magazine.com, "AD Boivin ETS Upgrade Kit for Arctic Cat", Feb. 26, 2000, pp. 1–3.
Denis Boivin, "Suspension Coupling & Vertical Down Force (VDF): The Rest of the Story", SnowTech, Dec., 1999, 3 pages.
Arctic Cat Fast Track Long Travel Suspension with Extra Travel Tunnel and Torque Sensing Link, 1997, one page.
A D Boivin, "The Missing Link Advertisement", 2 pages (Feb. 2000).
A.D. Boivin, "The Latest Technology Expert Suspension Advertisement", 4 pages (Feb. 2000).
Cliff Gromer, "Blizzard of '98", Jan., 1998, pp. 1–6.

* cited by examiner

*Primary Examiner*—Anne Marie Boehler
(74) *Attorney, Agent, or Firm*—Pillsbury Winthrop LLP (57) ABSTRACT

The present invention provides an apparatus and an aftermarket, upgrade kit constructed and arranged to be installed onto an uncoupled snowmobile suspension system that, when installed, converts the suspension system into a coupled suspension system. Specifically, the upgrade kit of the present invention is configured to be installed onto the Arctic Cat® line of snowmobiles. The upgrade kit includes a pair mounting brackets that are mounted to corresponding slide rails of the suspension system, a pair of support rods that each fixedly attach to the corresponding mounting bracket, and a pair of couplers that are pivotally interconnected to the slide rails by being pivotally mounted to the support rods.

16 Claims, 9 Drawing Sheets

APPARATUS AND KIT FOR COUPLING A SNOWMOBILE SUSPENSION

The present application claims priority to U.S. Provisional Application of Boivin et al., filed Mar. 9, 2000, Serial No. 60/188,153, the entirety of which is hereby incorporated into the present application by reference.

FIELD OF THE INVENTION

This invention relates to snowmobile suspension systems, and more particularly to uncoupled suspension systems, and even more particularly to an apparatus, in the form of an after-market, upgrade kit, to convert an uncoupled suspension system to a coupled suspension system.

BACKGROUND OF THE INVENTION

Tracked vehicles such as snowmobiles have rear suspension systems generally consisting of front and rear suspension arms pivotally mounted on shafts, which are rotatably connected to the frame of the snowmobile. They also include a slide frame, which comprises a pair of laterally spaced apart slide rails or longitudinal skids interconnected transversely on opposing lateral sides of the vehicle. The slide rails are in sliding contact with an endless belt which contacts the snow surface and drives the snowmobile. Front and rear suspension arms pivotally interconnect the chassis to the slide frame.

It is generally known in the art that independent movement of the front and rear suspension arms is less desirable than a suspension system in which the front and rear suspension arms are coupled. In an uncoupled suspension system, when the front suspension arm deflects as it contacts a bump, the independent rear suspension arm remains in its ride or fully extended position. This results in an angle of incidence between the slide rails and the bump. Unless the impact is so large that it compresses the rear suspension arm spring and shock absorber assembly, thereby flattening the angle of incidence, the slide rails will act as a ramp forcing the rear of the snowmobile upward. That is, with the slide rails angled in an upward incline due to the independent deflection of the front suspension arm, but not the rear suspension arm, the snowmobile will hop over the bump, imparting a secondary jolt which increases in intensity with the speed of the snowmobile. This secondary jolt also results in a loss of control and a reduction the speed of the snowmobile.

On the other hand, a coupled suspension system is one in which, for example, the rear portion of the suspension system reacts (i.e., is coupled) to the compression experienced by the front portion of the suspension system as the snowmobile passes over a bump in the terrain. In effect, the bump is "communicated" to the rear portion of the suspension, causing the rear portion to be pulled up ward toward the chassis before the rear portion actually reaches the bump. This reduces the angle of incidence between the slide rail and the bump, which thereby reduces the secondary jolt experienced by the rider. As a result, a coupled suspension system provides for an improved ride because the coupled suspension is better suited to adjust to varying terrain conditions.

Manufacturers have developed a variety of ways to provide coupled suspension systems, which typically involve restricting the amount of longitudinal movement of the rear suspension arm. Such systems are shown in U.S. Pat. Nos. 5,881,834, 5,692,579, 5,667,031, and 5,944,134 which are incorporated herein by reference.

Because a coupled suspension offers a superior ride than an uncoupled suspension, those skilled in the art of designing snowmobile suspensions have developed coupling apparatuses that may be added, as an after-market upgrade, to suspensions that are not coupled.

It is therefore the object of this invention to provide an apparatus, in the form of an after-market, upgrade kit, for installation onto an uncoupled snowmobile suspension system that, when installed, converts the uncoupled suspension system into a coupled suspension system.

It is further an object of the present invention to provide an apparatus, in the form of an after-market, upgrade kit, specifically configured to be installed onto the Arctic Cat® line of snowmobiles.

SUMMARY OF THE INVENTION

It is the object of the present invention, therefore, to provide an apparatus and an after-market, upgrade kit constructed and arranged to be installed onto an uncoupled snowmobile suspension system that, when installed, converts the suspension system into a coupled suspension system. Specifically, the upgrade kit of the present invention is configured to be installed onto the Arctic Cat® line of snowmobiles. The upgrade kit includes a pair mounting brackets that are mounted to corresponding slide rails of the suspension system, a pair of support rods that each fixedly attach to the corresponding mounting bracket, and a pair of couplers that are pivotally interconnected to the slide rails by being pivotally mounted to the support rods.

Other objects and advantages of the present invention will be realized in accordance with the following detailed description, appended drawings, and claims.

BRIEF DESCRIPTION OF THE DRAWINGS

The various embodiments of the present invention are shown throughout the drawings, in which.

DETAILED DESCRIPTION

Figure 1:
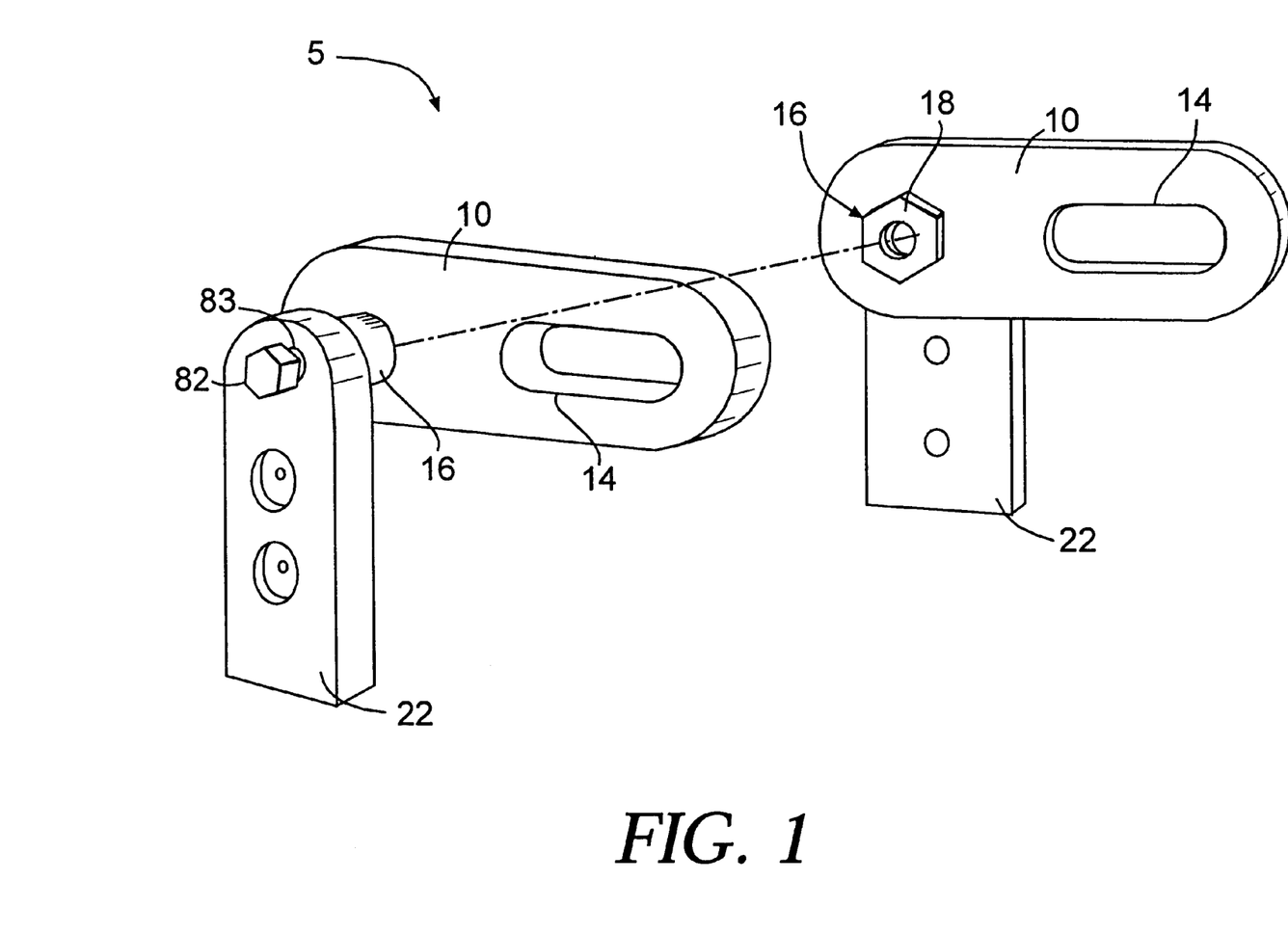
FIG. 1 is a perspective view of the preferred embodiment of the apparatus of the resent invention after assembly but before attachment to the snowmobile suspension.

Referring now more particularly to the Figures, wherein the same reference numbers are used where applicable, the apparatus of the present invention, which is also referred to as an upgrade kit, is generally indicated at 5 and is illustrated in FIG. 1. Generally, the upgrade kit 5 is constructed and arranged to be installed onto an uncoupled snowmobile suspension system, so that when installed, the suspension system becomes coupled. More specifically, the upgrade kit 5 is configured to be assembled onto the Arctic Cat® line of snowmobiles that are originally manufactured with uncoupled suspension systems, the details of which are described below. opposing lateral sides of the vehicle. The slide rails are in sliding contact with an endless belt which contacts the snow surface and drives the snowmobile. Front and rear suspension arms pivotally interconnect the chassis to the slide frame.

Figure 2:
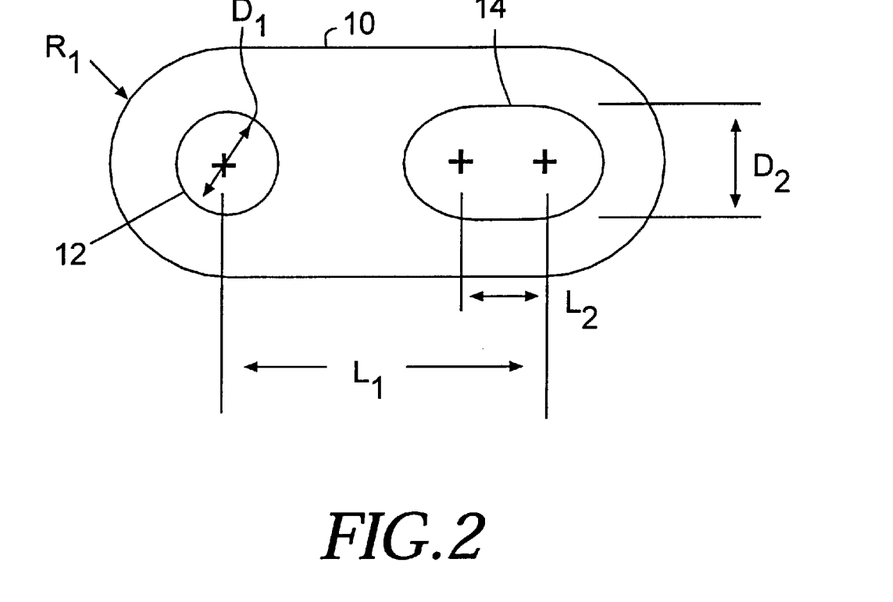
FIG. 2 is a plan view of a coupler of the upgrade kit of the preferred embodiment.
Figure 3:
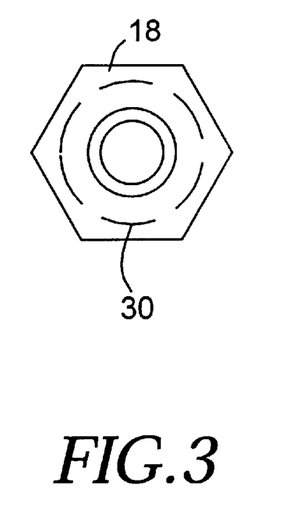
FIG. 3 is an end view of a swing arm tube of the upgrade kit of the preferred embodiment.
Figure 4:
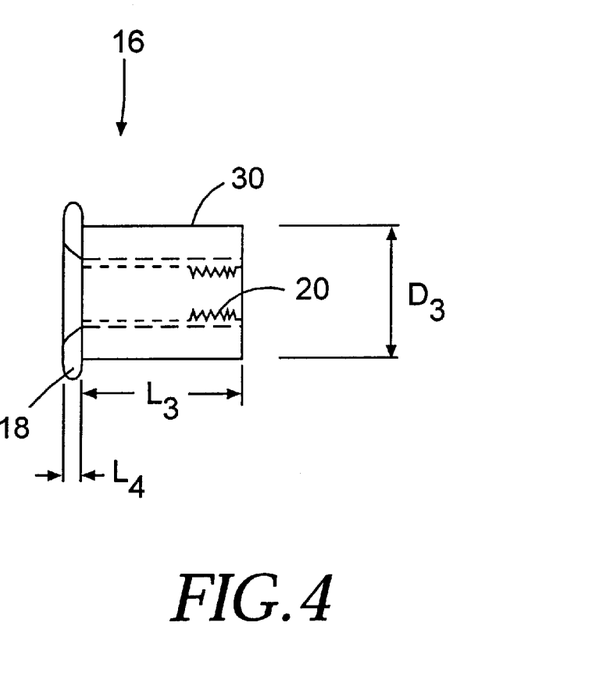
FIG. 4 is a side view of the swing arm tube of FIG. 3.

Referring to the FIGS. 1–5, the upgrade kit 5 comprises, among other components, two couplers 10, two support rods 16, and two mounting brackets 22. FIGS. 2–4 show each component separately, and FIG. 1 shows the upgrade kit 5 assembled, but not attached to the suspension system. The support rods are hereinafter referred to as swing arm tubes 16, and the mounting brackets are hereinafter referred to as flat plates 22. As seen in FIG. 2, the couplers 10 are flat oblong elements with essentially circular holes 12 formed therethrough at the one end and oblong holes or slots 14 formed therethrough at opposite ends thereof. Couplers 10 are preferably made of an ultra-high molecular weight plastic, but any other suitable material may be used, as would be understood by those skilled in the art. The thickness of the couplers 10 will vary depending on the material used, but the thickness is chosen to provide suitable stiffness and strength. In the preferred embodiment where ultra-high molecular weight plastic is used, the thickness of couplers 10 is approximately 0.5 inches.

The upgrade kit 5 also includes the two swing arm tubes 16, an end view of which is illustrated in FIG. 3 and a side view of which is shown in FIG. 4. Swing arm tubes 16 are essentially cylindrical, T-shaped elements with a hexagonal stop flange 18 at one end. Swing arm tubes 16 are provided with a threaded bore 20 down the center thereof for threaded placement of a bolt 82 therein. Although the bore 20 is shown passing through the entire swing arm tubes 16, the bore can terminate at an intermediate position therein, as long as the bore can accommodate a bolt.

When the upgrade kit 5 is assembled (FIG. 1), swing arm tube 16 is inserted into hole 12 of coupler 10 from an end opposite stop flange 18. The stop 18, which has an average outside diameter greater than hole 24, limits the transverse displacement of coupler 10. When assembled, the bore of holes 12 of couplers 10 are in rotational, sliding contact with outer, cylindrical surfaces 30 of the swing arm tubes 16. The cylindrical surfaces 30 are provided with a relatively smooth surface finish. The swing arm tubes 16 are preferably made of a corrosion-resistant, steel alloy material or from steel that has been appropriately treated so that it is corrosion resistant.

Figure 5A:
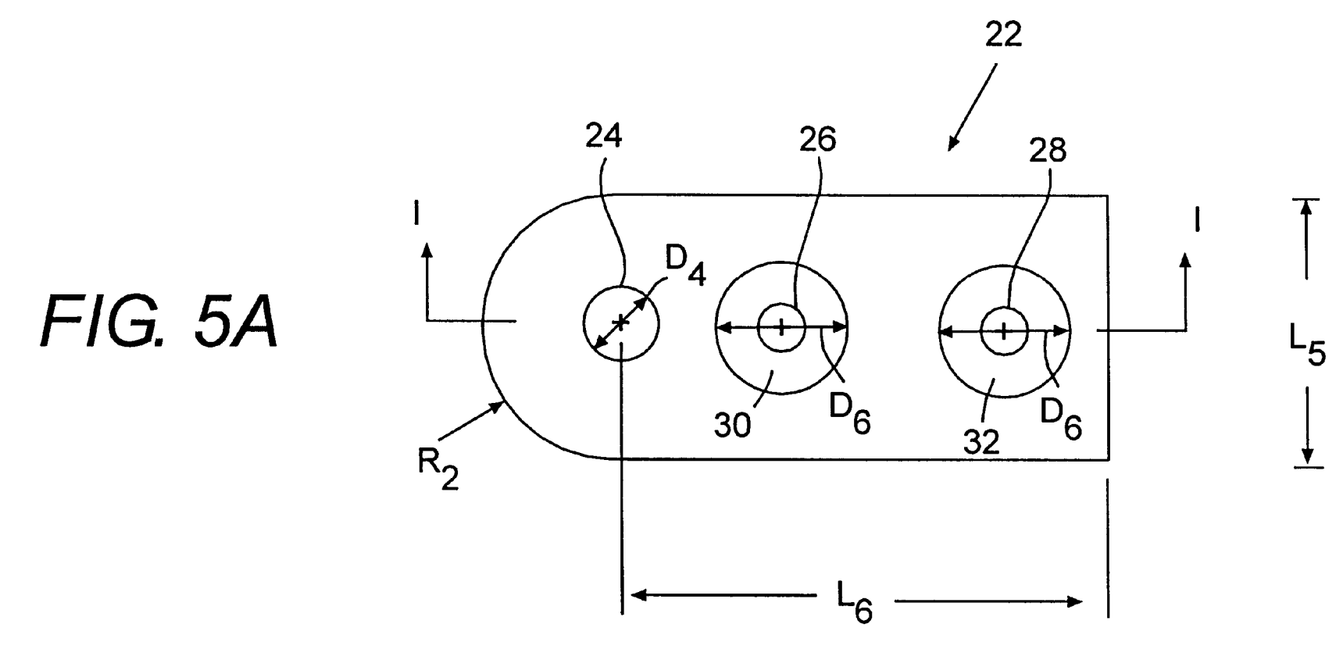
FIG. 5A is a plan view of a flat plate of the upgrade kit of the preferred embodiment.
Figure 5B:
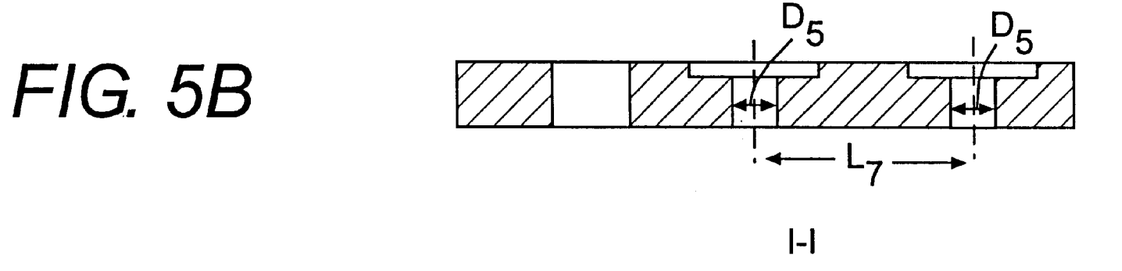
FIG. 5B is a cross-sectional side view of a flat plate of the upgrade kit of the preferred embodiment taken along section line 5B—5B.
Figure 8:
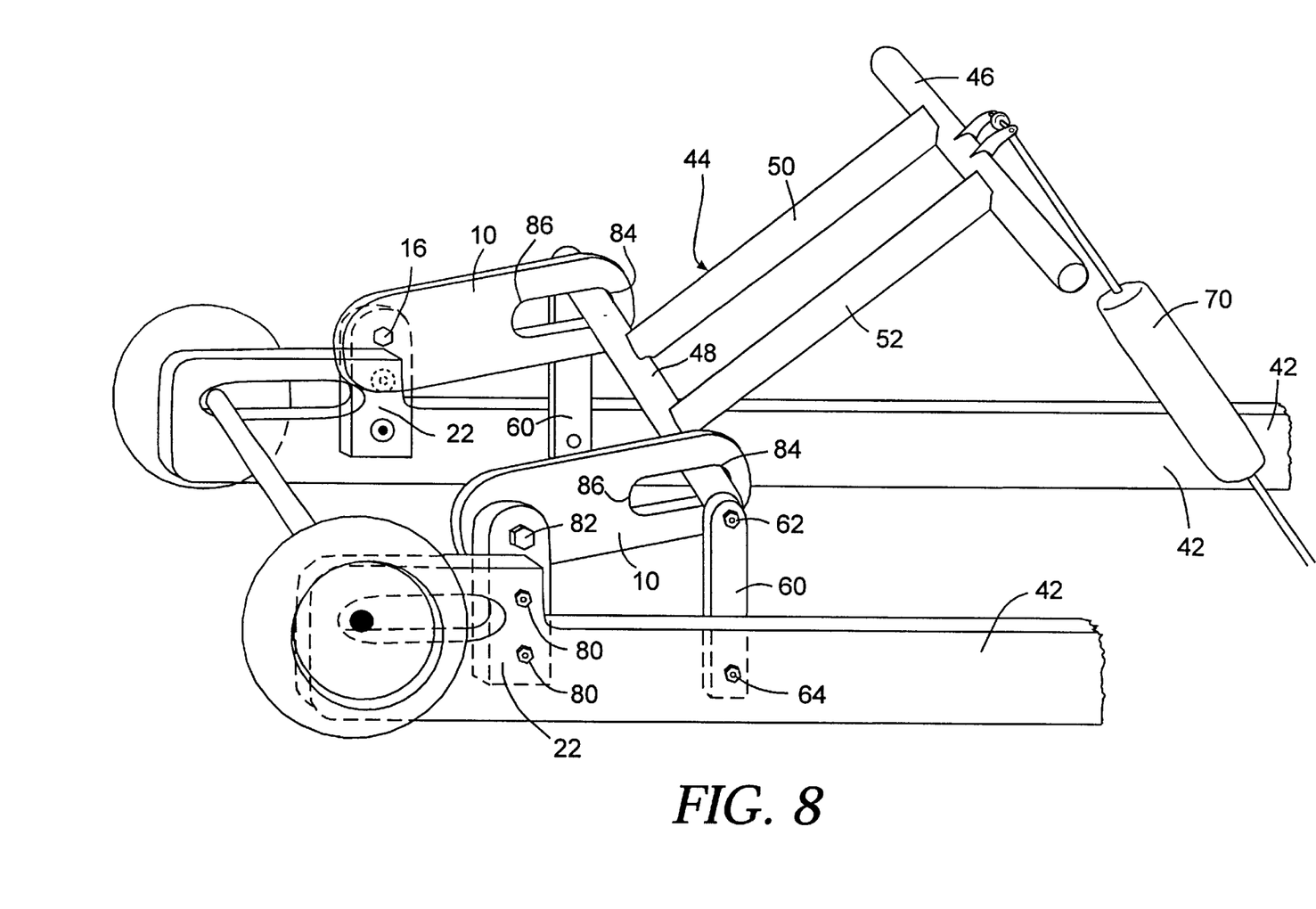
FIG. 8 is a perspective view of the upgrade kit of the preferred embodiment installed onto the Arctic Cat® snowmobile suspension system of FIG. 6.

Referring to FIGS. 5A and 5B, the two flat plates 22 are oblong elements with three holes 24, 26, and 28 formed therethrough. Holes 26 and 28 are provided with recesses 30, 32 on one side of plate 22 for receiving the head of a bolt (not shown), and are used to mount the plates 22 to the slide rails 42, which are shown in FIG. 8. Holes 24 receive bolts 82 (FIG. 1), which engage the threaded bore 20 of swing arm tubes 16 to thereby fixedly attach the swing arm tubes thereto. Preferably, so that they do not add excessive weight to the snowmobile and so that they provide sufficient strength to couple the suspension, plates 22 are made from aluminum. However any suitable material may be substituted therefor.

Figure 6:
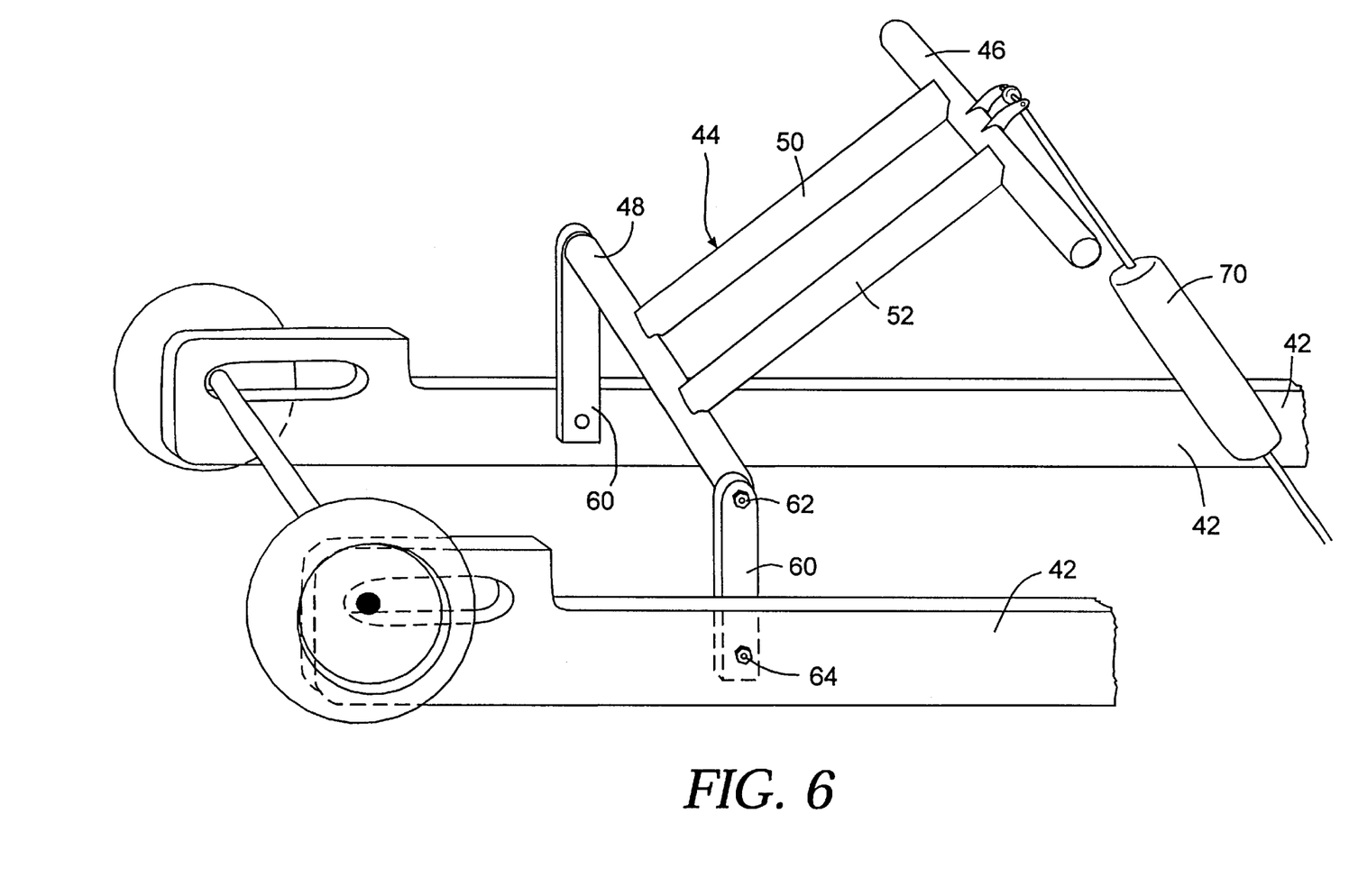
FIG. 6 is a perspective view of a portion of an Arctic Cat® snowmobile suspension system without the upgrade kit installed.
Figure 7:
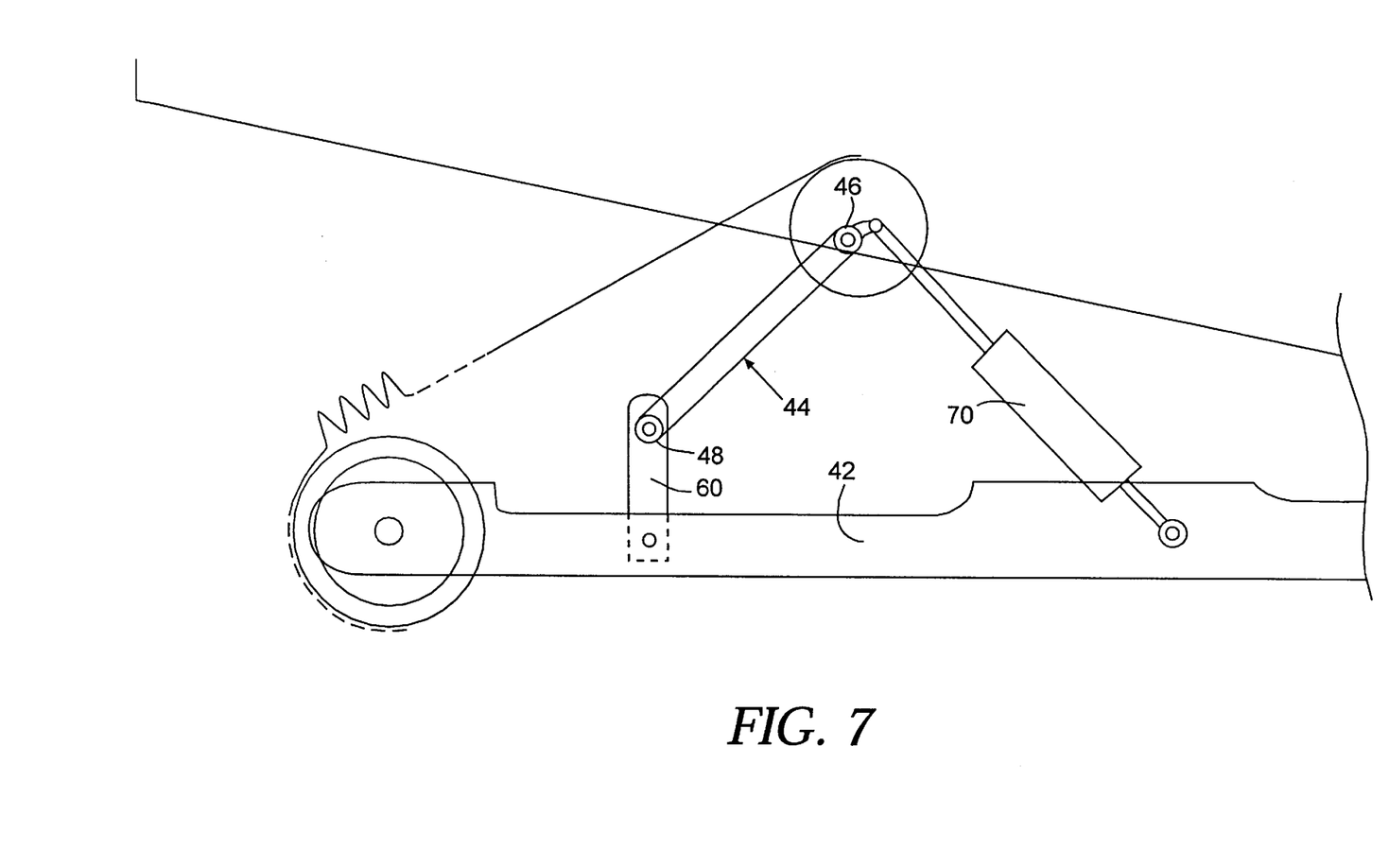
FIG. 7 is a side view of a portion of the Arctic Cat® snowmobile suspension system of FIG. 6.

Referring now to FIGS. 6 and 7, the couplers 10, swing arm tubes 16, and aluminum plates 22 are constructed and arranged to be assembled and attached to the slide rails 42 of an uncoupled snowmobile suspension system. More specifically, upgrade kit 5 is configured to be assembled onto an Arctic Cat® snowmobile suspension system, the rear portion of which is depicted, without the upgrade kit 5 attached, in FIG. 6. The suspension system of the Arctic Cat® includes slide rails 42 that are interconnected to the snowmobile chassis (not shown) by a rear suspension or swing arm 44. The rear suspension arm 44 is a trapezoidally-shaped structure that includes a traverse rear upper tube portion 46 and a traverse rear lower tube portion 48 that are connected by two tubes 50 and 52. The upper tube portion 46 of the rear suspension arm is pivotally mounted on a first traverse shaft (not shown) that is fixedly attached to the chassis. Likewise, the lower tube portion 48 of the rear suspension arm 44, which extends downwardly and rearwardly, is pivotally mounted on a second traverse shaft (not shown) that is fixedly attached to an end of lower arms 60 by bolts 62. Lower arms 60, in turn, are pivotally attached to the corresponding slide rails 42 by bolts 64. A shock absorber 70 extends from the upper tube portion 46 of the rear suspension arm 44 downwardly and forwardly to fixedly connect to a lower transverse shaft (not shown), which is fixedly attached to slide rails 42. The suspension system further includes a front suspension arm (not shown) and a front shock absorber (not shown). As is known in the art, the Arctic Cat® suspension system described and shown above is uncoupled. That is, the front and rear suspension arms move independently from one another.

Figure 9:
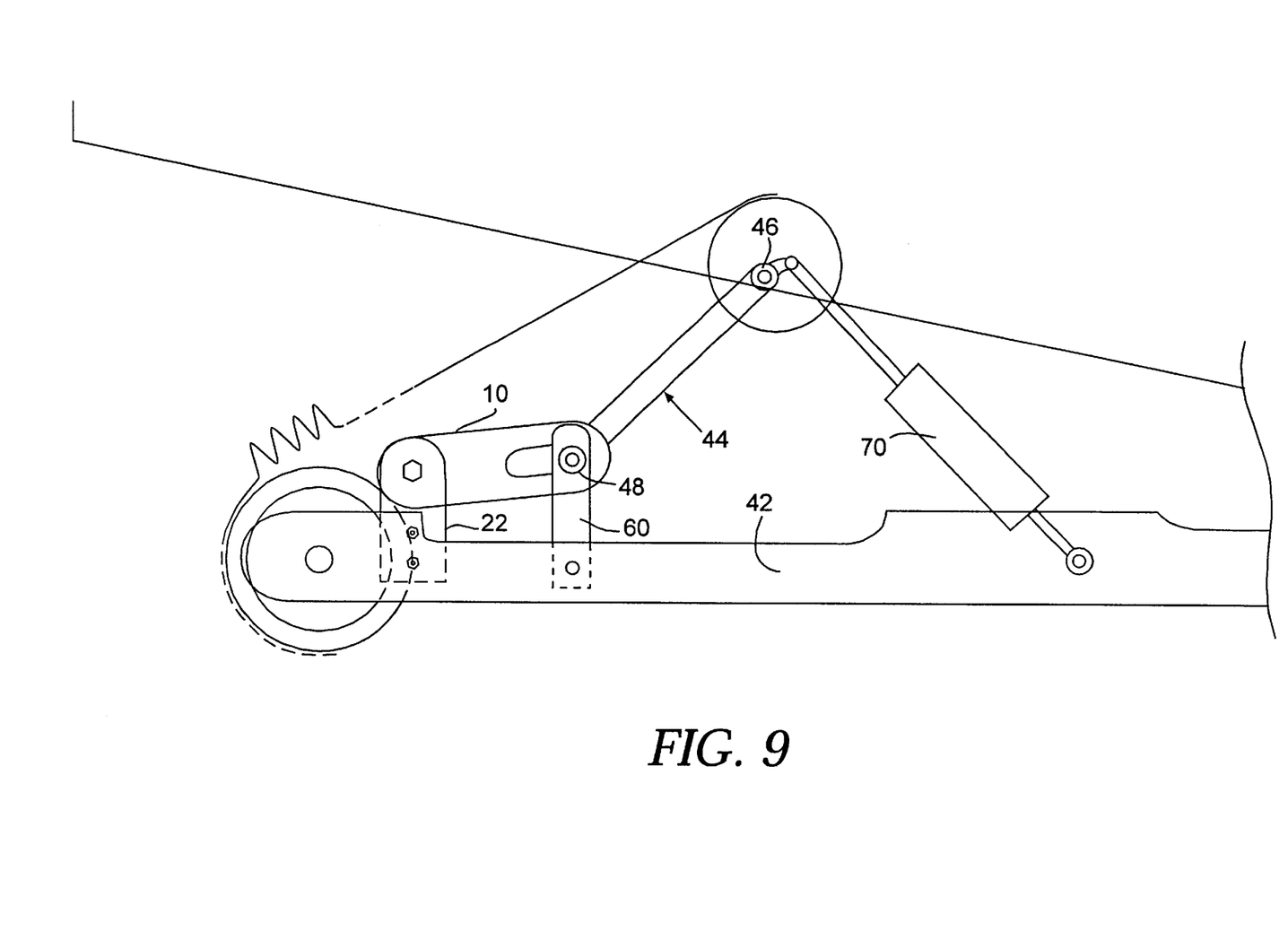
FIG. 9 is a side view of the upgrade kit installed onto the Arctic Cat® snowmobile suspension system of FIG. 8.
Figure 10:
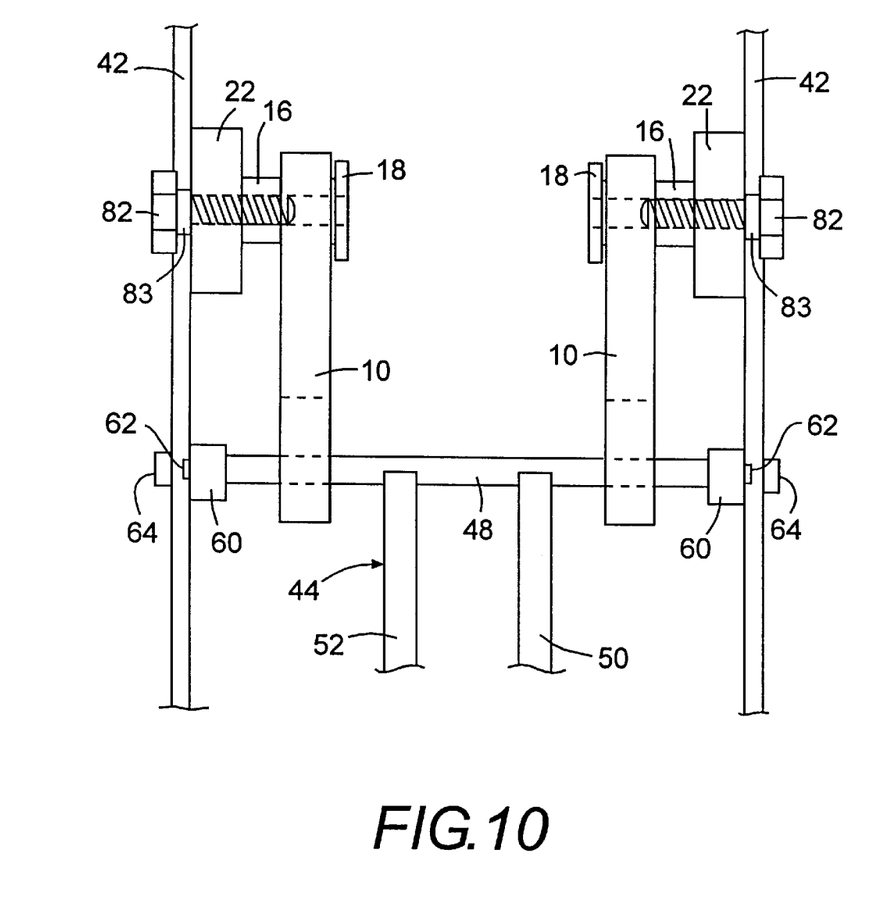
FIG. 10 is a top view of the upgrade kit installed onto the Arctic Cat® snowmobile suspension system of FIG. 8.

Referring now to FIGS. 8–10, the attachment of upgrade kit 5 to the Arctic Cat® suspension system will now be described. Flat plates 22 are attached to the interior of the snowmobile slide rails 42 on either side of the suspension, rearward of lower arms 60. In the preferred embodiment, the flat plates 22 are fixedly attached to slide rails 42 by being bolted thereto with bolts 80 that pass through corresponding through holes provided in slide rails 42. Bolts 80, nuts and lock washers (not shown) engage holes 26, 28 provided in flat plates 22. Bolts 80 may also be the same bolts used to mount a track adjuster (not shown), which is mounted exteriorly on either side of the slide rails 42, as is known in the art. Although shown being bolted to the slide rails, the flat plates could also be fixedly attached thereto by other fastening mechanisms, such as welding or brazing. Additionally, flat plates 22 could be integrally formed with slide rails 42, rather than being separate, distinct elements.

The couplers 10 are pivotally interconnected to the flat plates 22 via swing arm tubes 16. Each swing arm tube 16 is inserted into hole 12 of couplers 10, with the stop flange 18 facing the interior of the suspension system, and fixedly connected to flat plate 22 with bolts 82 and lock washers 83 (FIG. 1). Each cylindrical, swing arm tube 16 thus provides a pivot point for couplers 10 to rotate. Because the length of each swing arm tube 16 is greater than the thickness of the couplers 10, as best seen in FIG. 10, the couplers can also slidingly translate in the transverse direction on the cylindrical surface 30 of swing arm tubes 16. The couplers 10 are then connected to the rear swing arm 44 by removing bolt 62 and rotating lower arm 60 so that a free end of lower tube portion 48 is exposed. Each coupler 10 is slipped over lower tube portion 48 through oblong slot 14, and the rear swing arm 44 is reattached to lower arm 60.

Figure 11A:
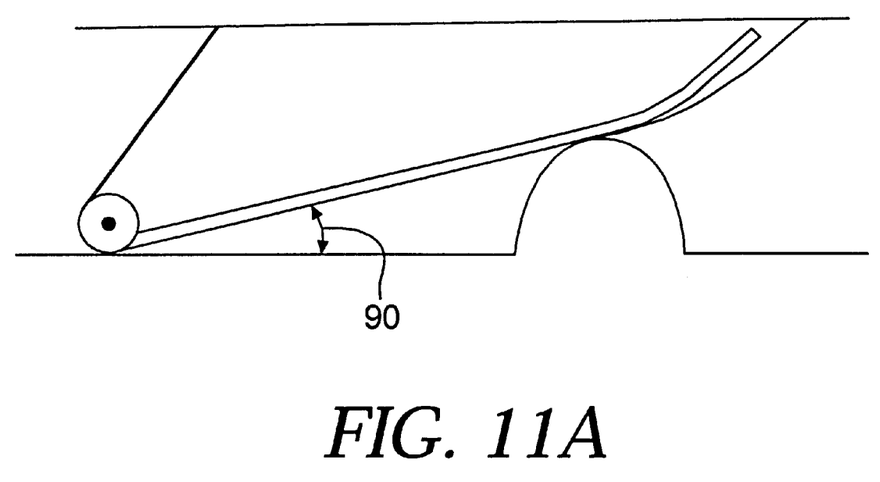
FIG. 11A is a depiction of the angle of incidence experienced by the slide rails as the snowmobile passes over a bump when the suspension system in uncoupled, i.e., the upgrade kit is not installed.

Once assembled, the couplers 10 couple the suspension system to improve the ride of the snowmobile. Prior to the installation of the upgrade kit, when the snowmobile hits a bump, as depicted in FIG. 11A, the front of the slide rail 42 compresses before the rear of the slide rail, and as the slide rails 42 move upward the rear suspension arm 44 pivots about a shaft (not shown) fixedly attached by the bolts 62. At the same time, lower arm 60 freely pivots about bolt 64, and this pivoting movement of lower arm 60 is not limited in either rotation direction. Since lower arm 60 in unrestrained from rotational movement, the suspension system, without the upgrade kit installed, is uncoupled. That is, as the front of the slide rails 42 hits a bump, the front of the slide rails 42 rise but the rear of the slide rails 42 are still at the bottom of the bump, causing the slide rail 42 to be presented at a specific angle of incidence 90 as the rear of the slide rail 42 approaches the bump. The greater this angle of incidence is, the more secondary kick there is to the rider when the rear hits the bump and the greater the loss of control there is to the rider, and the greater loss of speed of the vehicle.

Figure 11B:
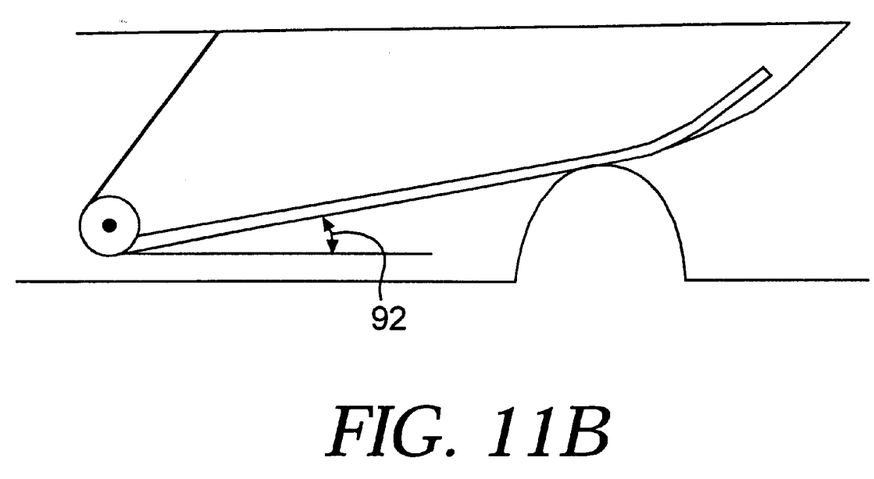
FIG. 11B is a depiction of the angle of incidence experienced by the slide rails as the snowmobile passes over a bump when the suspension system in coupled, i.e., the upgrade kit is installed.

With the upgrade kit 5 installed, as the front of the slide rails 42 rise, causing rotational movement of the rear suspension arm 44 and lower arms 60, the lower arms 60 are restrained from freely rotating due to the limitation imposed on it by couplers 10. For example, as the lower arm 60 rotates clockwise as shown in FIG. 8, the lower tube portion 48 engages the forward end 84 of slots 14 and imparts a pulling force to the coupler 10. Since couplers 10 are interconnected to the slide rails 42, the rear of slide rails 42 are correspondingly pulled upward, as shown in FIG. 11B. Thus, the suspension system becomes "front to rear coupled" with the upgrade kit installed. That is, as the front of the suspension hits a bump, the front "communicates" with the rear and forces (or pulls) the rear upward prior to the rear actually hitting the bump. This causes the rail to be presented at a specific angle of incidence 92 as the rear of the rail approached the bump, where the angle of incidence 92 (with coupling) is less than the angle of incidence 90 (without coupling). This reduction in the angle of incidence as a result of the system being coupled with upgrade kit 5 reduces secondary kick, provides more control to the rider, and minimizes the loss of speed as the snowmobile passes over the bump.

Similarly, with the upgrade kit installed, the suspension system becomes "rear to front" coupled. Where the rider lands on the back of the snowmobile, after the rear suspension arm 44 has displaced the length of slot 14 to the rear, due to the counterclockwise rotation of lower arm 60 as shown in FIG. 6, further movement and rotation are prevented by the lower tube's 48 engagement with a rearward end 86 of slot 14. This stopped travel in the rear suspension arm 44 causes the front suspension arm (not shown), and thus the front of the slide rails, to start to displace upward. Thus, the suspension system becomes coupled from the rear to the front. Without the upgrade kit 5 installed, where the rider lands on the back of the snowmobile, the front suspension arm is independent of the rear arm and only the rear suspension arm 44 collapses.

Though not intended to be limiting, the dimensions of the components of upgrade kit 5, which are sized for the Arctic Cat® line of snowmobile suspensions, are the following:

TABLE 1

Dimensions of upgrade kit components.

| | dimension (inches) |
|---|---|
| Couplers 10 (FIG. 2) | |
| L1 | 2.875 |
| L2 | 0.750 |
| D1 | 0.875 |
| D2 | 1.000 |
| R1 | 1.000 |
| Swing arm tubes 16 (FIG. 4) | |
| L3 | 1.000 |
| L4 | 0.100 |
| D3 | 0.875 |
| Flat plates 22 (FIGS. 5A, 5B) | |
| L5 | 1.500 |
| L6 | 1.813 |
| L7 | 1.250 |
| D4 | 0.437 |
| D5 | 0.250 |
| D6 | 0.750 |

The upgrade kit 5 with the above dimensions is intended for the following Arctic Cat® snowmobile models: the Z 440 (model years 1998 and 1999); the entire ZL series (model years 1998–2000); the entire ZR series (model years 1997–2000); the entire ZRT series (model years 1997–2000); the Thunder Cat® (model years 1998–2000); the Cougar DLX (model year 1998 only); and the EXT, EFI, DLX, and 600 (model year 1998 only).

However, as would be understood by those skilled in the art, there are potentially other snowmobile suspensions on which the present invention may be used.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components provided are not meant to be limiting, and the size of the components can vary from the size that is portrayed in the figures and table herein in order to accommodate differently sized suspension system components.

What is claimed is:

1. An apparatus for coupling an uncoupled snowmobile suspension, the suspension including a pair of laterally spaced slide rails and a rear suspension arm connected to the slide rails, the coupling apparatus comprising:

a pair of mounting brackets, each being attachable at one end to one of the slide rails on the snowmobile suspension;

a pair of support rods, each having a stop flange at one end and being connected to the mounting bracket at the other end; and a pair of couplers, each defining a through hole at one end to pivotally receive one of the support rods and defining an oblong hole therethrough at the other end to pivotally and slidingly receive a lower portion of the rear suspension arm, wherein in a coupled state of the coupling apparatus and the snowmobile suspension, as the snowmobile suspension is compressed and front ends of the slide rails move upward, the rear suspension arm imparts a pulling force on the couplers from within the oblong holes to pull the mounting brackets and the slide rails upwardly, thereby coupling movement of the front and rear of the snowmobile suspension.

2. The apparatus of claim 1, wherein each mounting bracket further defines a hole therethrough at the other end, and each support rod defines a bore therein.

3. The apparatus of claim 2, further comprising a pair of fasteners, each displaceable within the bores in the support rods, to connect the pair of support rods to the pair of mounting brackets through the holes in the mounting brackets.

4. The apparatus of claim 1, wherein the couplers are made of ultra-high molecular weight plastic.

5. The apparatus of claim 1, wherein the mounting brackets are made of aluminum.

6. The apparatus of claim 1, wherein the support rods are made of a steel alloy.

7. The apparatus of claim 1, wherein the stop flanges are integrally formed with the support rods.

8. The apparatus of claim 3, wherein the bores in the support rods and the pair of fasteners are threaded for removable engagement with one another.

9. A kit for coupling an uncoupled snowmobile suspension, the suspension including a pair of laterally spaced slide rails and a rear suspension arm connected to the slide rails, the kit comprising:

a pair of mounting brackets, each being constructed and arranged to be attached to one of the slide rails on the snowmobile suspension;

a pair of support rods, each having a stop flange at one end, the support rods being constructed and arranged to be connected to the mounting bracket at the other end; and a pair couplers, each defining a through hole at one end and an oblong hole at the other end, the couplers being constructed and arranged to pivotally receive one of the support rods within the through hole and pivotally and slidingly receive a lower portion of the rear suspension arm, wherein when the kit is installed onto the snowmobile suspension, as the snowmobile suspension is compressed and front ends of the slide rails move upward, the rear suspension arm imparts a pulling force on the couplers from within the oblong holes to pull the mounting brackets and the slide rails upwardly, thereby coupling movement of the front and rear of the snowmobile suspension.

10. The kit of claim 9, wherein each mounting bracket further defines a hole therethrough at the other end, and each support rod defines a bore therein.

11. The kit of claim 10, further comprising a pair of fasteners, each being constructed and arranged to be displaceable within the bores in the support rods, to connect the pair of support rods to the pair of mounting brackets through the holes in the mounting brackets.

12. The kit of claim 9, wherein the couplers are made of ultra-high molecular weight plastic.

13. The kit of claim 9, wherein the mounting brackets are made of aluminum.

14. The kit of claim 9, wherein the support rods are made of a steel alloy.

15. The kit of claim 9, wherein the stop flanges are integrally formed with the support rods.

16. The kit of claim 11, wherein the bores in the support rods and the pair of fasteners are threaded for removable engagement with one another.

* * * * *